US008645177B2

(12) United States Patent
Pachon et al.

(10) Patent No.: US 8,645,177 B2
(45) Date of Patent: Feb. 4, 2014

(54) SINGLE STEP FLIGHT SCHEDULE OPTIMIZATION

(75) Inventors: Julian Pachon, Austin, TX (US); Stuart H. Smith, Austin, TX (US)

(73) Assignee: Accenture Global Services Limited, Dublin 4 (IE)

( * ) Notice: Subject to any disclaimer, the term of this patent is extended or adjusted under 35 U.S.C. 154(b) by 1094 days.

(21) Appl. No.: 12/243,490

(22) Filed: Oct. 1, 2008

(65) Prior Publication Data

US 2010/0082383 A1 Apr. 1, 2010

(51) Int. Cl.
*G06Q 10/06* (2012.01)
(52) U.S. Cl.
CPC .................................... *G06Q 10/06* (2013.01)
USPC ....................................................... 705/7.12
(58) Field of Classification Search
USPC ........................................................ 705/7.12
See application file for complete search history.

(56) References Cited

U.S. PATENT DOCUMENTS

| | | | | |
|---|---|---|---|---|
| 5,121,325 A * | 6/1992 | DeJonge | | 701/123 |
| 6,314,361 B1 | 11/2001 | Yu et al. | | |
| 6,335,733 B1 * | 1/2002 | Keren et al. | | 345/418 |
| 7,340,405 B1 | 3/2008 | Günther et al. | | |
| 7,707,056 B1 * | 4/2010 | Anbil et al. | | 705/7.12 |
| 7,734,493 B1 | 6/2010 | Anbil | | |
| 2003/0105616 A1 * | 6/2003 | Chang et al. | | 703/13 |
| 2003/0167109 A1 | 9/2003 | Clarke et al. | | |
| 2003/0225598 A1 * | 12/2003 | Yu et al. | | 705/5 |
| 2005/0027579 A1 | 2/2005 | Tiourine et al. | | |
| 2005/0108068 A1 | 5/2005 | Marcken et al. | | |
| 2005/0246208 A1 | 11/2005 | Langerman | | |
| 2007/0214033 A1 | 9/2007 | Miller | | |
| 2008/0133304 A1 * | 6/2008 | Clarke et al. | | 705/8 |
| 2009/0125357 A1 * | 5/2009 | Vannette et al. | | 705/8 |
| 2010/0057511 A1 * | 3/2010 | Mansouri et al. | | 705/7 |

FOREIGN PATENT DOCUMENTS

| | | |
|---|---|---|
| CN | 1462004 A | 12/2003 |
| EP | 1072991 A2 | 1/2001 |
| WO | WO0221387 A1 | 3/2002 |
| WO | 02097570 A2 | 12/2002 |
| WO | 2008106642 A1 | 9/2008 |
| WO | 2008109317 A1 | 9/2008 |

OTHER PUBLICATIONS

Diego Klabjan, Airline Crew Pairing Generation in Parallel, Apr. 19, 2004, Dept of Mechanical and Industrial Engineering, University of Illinois at Urbana-Champaign.*

(Continued)

*Primary Examiner* — Romain Jeanty
*Assistant Examiner* — Kurtis Gills
(74) *Attorney, Agent, or Firm* — Fish & Richardson P.C.

(57) ABSTRACT

The subject matter of this specification can be embodied in, among other things, a method that includes generating a first graph including possible flight segments between airline stations for an airline and determining a set of permissible crew pairings based on a traversal of the first graph. The method also includes generating a second graph comprising the determined set of permissible crew pairings and determining a set of permissible aircraft routings based on a traversal of the second graph. The method includes generating a set of optimized aircraft routings using an integer-programming algorithm that accepts the determined set of permissible aircraft routings as input, and outputting the set of optimized aircraft routings for use in a flight schedule.

21 Claims, 8 Drawing Sheets

(56) References Cited

OTHER PUBLICATIONS

Vance, Pamela H. et al., Airline Crew Scheduling: A New Formulation and Decomposition Algorithm, School of Industrial and Systems Engineering, Georgia Institute of Technology, May 1995, pp. 1-32, http://www.google.com/url?paf=&q=http://www.researchgate.net/publication/2700648_Airline_Crew_Scheduling_A_New_Formulation_and_Decomposition_Algorithm.*

Examination Report for Application No. 09252320.8-2215 dated Jan. 25, 2011, 4 pages.

Examination Report for Application No. 09252318.2-2215 dated Jan. 25, 2011, 4 pages.

Partial European Search Report in Application No. 09252318.2-2215 dated Jan. 27, 2010, 7 pages.

Patent Examination Report No. 1 for Australian Patent Application No. 2009222494, dated Apr. 23, 2013, 3 pages.

Patent Examination Report No. 1 for Australian Patent Application No. 2009222493, dated May 3, 2013, 4 pages, Phillips, et al., An Integrated Approach to Airline Fleet and Schedule Planning, AGIFORS PROC. 29TH (1989), pp. 283-298.

Lohatepanont, et al., Airline Schedule Planning: Integrated Models and Algorithms for Schedule Design and Fleet Assignment, Transp. Sci., vol. 38, No. 1, Feb. 2004, pp. 19-32.

Mathaisel, Fleet Assignment with Variable Demand: A Goal Programming Approach, MIT Thesis, Aug. 1983, 24 pp.

Examination Report for Chinese Patent Application No. 200910178998.3, issued Nov. 28, 2012, 12 pages.

* cited by examiner

400 ⤴

Graph of Possible Crew Connections

| Austin | | |
|---|---|---|
| Flight | Arrival | Departure |
| Aircraft Flight 1 | 9:30 AM CST | |
| Aircraft Flight 2 | | 10:15 AM CST |
| Aircraft Flight 3 | | 10:10 AM CST |
| Aircraft Flight 4 | | 11:00 AM CST |

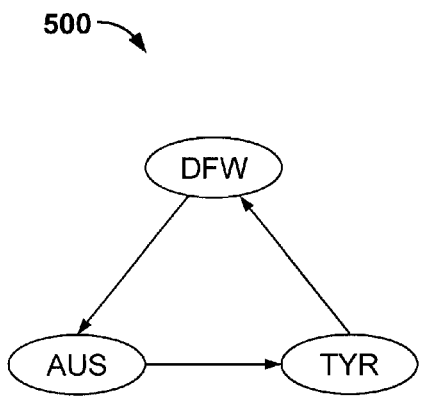
Permissible Crew Pairing
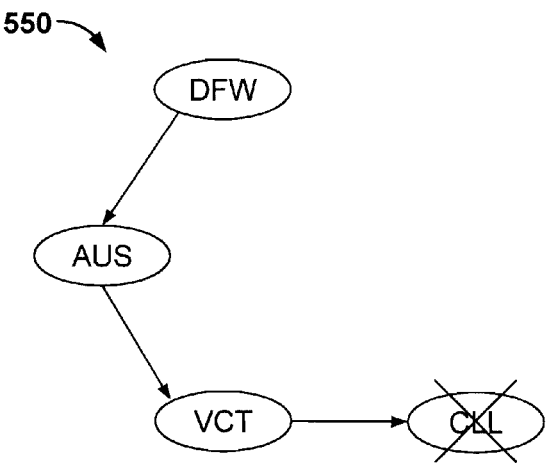
Impermissible Crew Pairing due to Exceeding Fly Time Constraint for Crew
FIG. 5A          FIG. 5B
Graph of Possible Aircraft Routing
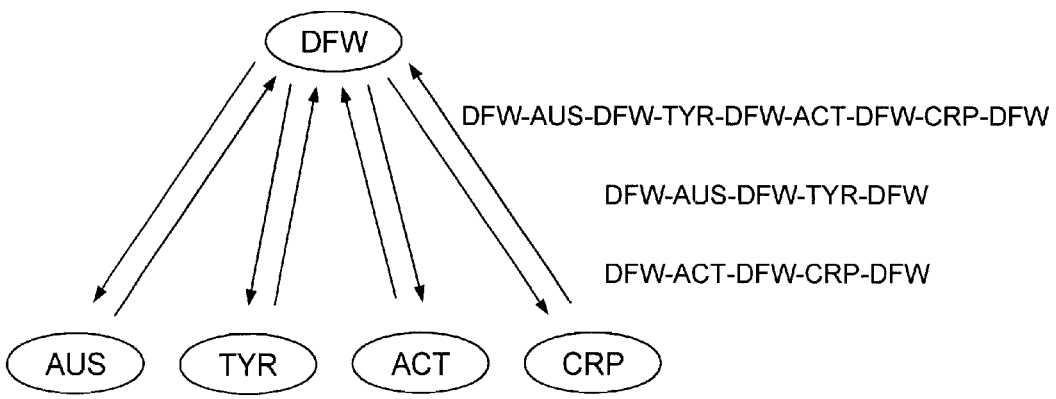
FIG. 6

SINGLE STEP FLIGHT SCHEDULE OPTIMIZATION

TECHNICAL FIELD

This document relates to creating airline flight schedules.

BACKGROUND

An Airline Scheduling and Routing (ASR) problem is a problem faced by an airline in creating flight schedules for a single heterogeneous aircraft fleet. A flight schedule can include a sequence of flights to be flown by a single aircraft (i.e., routing) and the departure and arrival times for each flight leg (i.e., scheduling). An efficient and cost-effective solution to the ASR problem may be extremely critical to the airline, since a given schedule determines a significant portion of the airline's overall cost including the fixed cost for each aircraft, fuel cost, maintenance costs, and the cost of crew members assigned to operate the airline's final flight schedule.

Given that the airline has a fixed number of aircraft to operate at any given time and that the fixed cost for adding and operating additional aircraft is very high, it is imperative that the airline utilize its existing aircraft resources in the most efficient manner. Since different flight schedules result in varying costs and revenues to the airline, substantial cost reductions and revenue increases can be obtained by generating optimal or near-optimal aircraft schedules. However, due to the extremely large number of possible flight schedules and the numerous operational and regulatory restrictions that must be enforced, the ASR problem is a highly complex problem that requires the use of sophisticated mathematical modeling and solution algorithms in order to produce optimal solutions.

SUMMARY

In general, this document describes systems and techniques for generating optimized flight schedules for airlines. As previously mentioned, a flight schedule may indicate a sequence of flights flown by an aircraft (i.e., aircraft routings) and the departure and arrival times for each flight leg (i.e., flight scheduling). In determining a final flight schedule used to dictate flights flown by an airline, the airline may take into account permissible crew pairings (e.g. a sequence of one or more flights that a crew is permitted to fly subject to contractual, regulatory, or actual constraints) for the aircraft routings included in the final flight schedule.

The optimized flight schedules may serve as a solution to the previously mentioned Airline Scheduling and Routing (ASR) problem faced by airlines. In one implementation, the ASR problem may be divided into three sub-problems: generating an optimized flight schedule, generating optimized aircraft routings, and generating optimized crew pairings. These three sub-problems may be solved separately. For example the airline may generate the optimized flight schedule, then generate the optimized aircraft routings, and finally generate the optimized crew pairings. However, solving the three sub-problems separately may make it impossible to achieve a global optimal solution.

In a first general aspect, implementations are described in which the ASR problem is solved by combining the solutions of the three sub-problems into a single optimization step. The optimized flight schedule can be generated based on aircraft routings that already take into account permissible crew pairings for the aircraft routings.

For example, permissible airline routings may be generated so that permissible crew pairings are taken into account in the generation of the permissible airline routings. Then optimized airline routings may be selected from the permissible airline routings. Consequently, the optimized airline routings used in an optimized flight schedule will already be associated with permissible crew pairings.

In another general aspect, implementations are described in which constraints are added to a schedule optimizer so that a user acting on behalf of the airline can specify a particular number of optional flights to include in a final flight schedule. For example, an airline may have some flights that, regardless of cost and/or revenues, the airline will fly to ensure, for example, that the airline maintains a presence in a market or does not lose gates or slots at an airline station. The airline may consider these flights "mandatory" flights that will always be part of the schedule.

In contrast, an optional flight is not mandatory and will not necessarily always be part of a flight schedule. For example, an airline may designate some flights as optional when analyzing new destinations or new frequencies of flights between an existing flight route. For instance, if an airline is considering two new destinations for flight routes, a user for the airline can select the new destinations as optional.

In some implementations, a schedule optimizer can select whether to include zero, one, or both of the new destinations in a flight schedule based on factors such as revenue, cost, and overall feasibility of the network (e.g., availability of equipment and personnel). Additionally, the schedule optimizer may permit the user to specify not only whether optional flights are included in the final flight schedule, but may also permit the user to specify a maximum or minimum number of the optional flights to include in the optimized flight schedule.

For example, an airline may have six possible optional flights for a particular flight route (e.g., Dallas/Fort Worth to Houston). Without user input, the schedule optimizer may return a flight schedule including all of the optional flights, none of the optional flights, or some number in between. However, the user may also specify that the schedule optimizer try to return at least three optional flights and not more than five optional flights. The schedule optimizer can then use these additional constraints during the optimization used to generate the flight schedule.

In yet another general aspect, a computer-generated method for generating aircraft routings is described. The method includes generating a first graph including possible flight segments between airline stations for an airline and determining a set of permissible crew pairings based on a traversal of the first graph. A permissible crew pairing includes a sequence of one or more flight segments that a crew is permitted to travel subject to specified first constraints. The method also includes generating a second graph comprising the determined set of permissible crew pairings and determining a set of permissible aircraft routings based on a traversal of the second graph. A permissible aircraft routing includes a series of one or more flight segments for an aircraft to fly subject to specified second constraints. The method also includes generating a set of optimized aircraft routings using an integer programming algorithm that accepts the determined set of permissible aircraft routings as input, and outputting the set of optimized aircraft routings for use in a flight schedule.

In another general aspect, a system for generating airline routings is described. The system includes one or more computers having a crew pairing generation module to determine a set of permissible crew pairings based on a traversal of a first graph comprising possible flight segments between airline stations for an airline. A permissible crew pairing includes a sequence of one or more flight segments that a crew is permitted to travel subject to specified first constraints. The one or more computers also have an aircraft routing module to determine a set of permissible aircraft routings based on a traversal of a second graph comprising the determined set of permissible crew pairings. A permissible aircraft routing includes a series of one or more flight segments for an aircraft to fly subject to specified second constraints. The system including the one or more computers also includes an column generation module to receive the determined set of permissible aircraft routings as input and output a set of optimized aircraft routings based on specified optimization constraints.

The systems and techniques described here may provide one or more of the following advantages. First, simultaneous solution for both aircraft routing and crew pairing using a modified column generation approach may be provided. Operational efficiencies and cost savings can be realized by solving the aircraft routing and crew pairing problems with a single model. Additionally by including crew pairing constraints in the aircraft routing problem, the final flight schedule may be assured of being crew feasible and may greatly simplify the creation of consistent crew pairings.

Also, the addition of constraints into an optimization model may permit greater flexibility in user selection of a subset of flights within a market from a given set of possible flight schedules. This may, in turn, provide more flexibly in choosing a final flight schedule for an airline.

The details of one or more embodiments are set forth in the accompanying drawings and the description below. Other features and advantages will be apparent from the description and drawings, and from the claims.

DESCRIPTION OF DRAWINGS

FIGS. 5A and 5B are diagrams of portions of a first graph illustrating permissible and impermissible crew pairings.

FIG. 6 shows an example second graph of a possible aircraft routing for a single aircraft.

Like reference symbols in the various drawings indicate like elements.

DETAILED DESCRIPTION

This document describes systems and techniques for generating optimized flight schedules for airlines. The optimized flight schedules may serve as a solution to the previously mentioned Airline Scheduling and Routing (ASR) problem faced by airlines.

As previously described, the ASR problem may be divided into three sub-problems that are separately solved: generating an optimized flight schedule, generating optimized aircraft routings, and generating optimized crew pairings.

For example, the airline may generate the optimized flight schedule so that the total profit for the airline is maximized. Given the determined flight schedule, the airline may then separately generate the optimized flight routings. The airline may then generate the crew pairings after the creation of the flight schedule and the aircraft routings. Airlines may aim to generate crew pairings that cover the entire flight schedule, follow the optimized aircraft routings as much as possible, and minimize crew specific costs (e.g. hotels, per diems, allowances etc).

Although these three sub-problems of the ASR problem may be solved separately, this approach may make it impossible to achieve a global optimal solution.

In other implementations described in more detail below, a solution to the ASR problem is given that solves the three sub-problems in a single optimization step. In some implementations, a simultaneous solution of the flight schedule, aircraft routing, and crew pairing problems may include using a modified column generation approach. Additionally, in some implementations, the simultaneous solution is described in the context of an airline that operates one-day pairings.

In yet other implementations, an addition of constraints into an optimization model is described, where the additional constraints enable flexibility in the selection a subset of flights within a market from a given set of possible flight schedules. The additional constraints may be added to the optimization model used to simultaneously solve the three sub-problems, or the additional constraints may be added one of the optimization models used in solving the three sub-problems separately.

Figure 1:
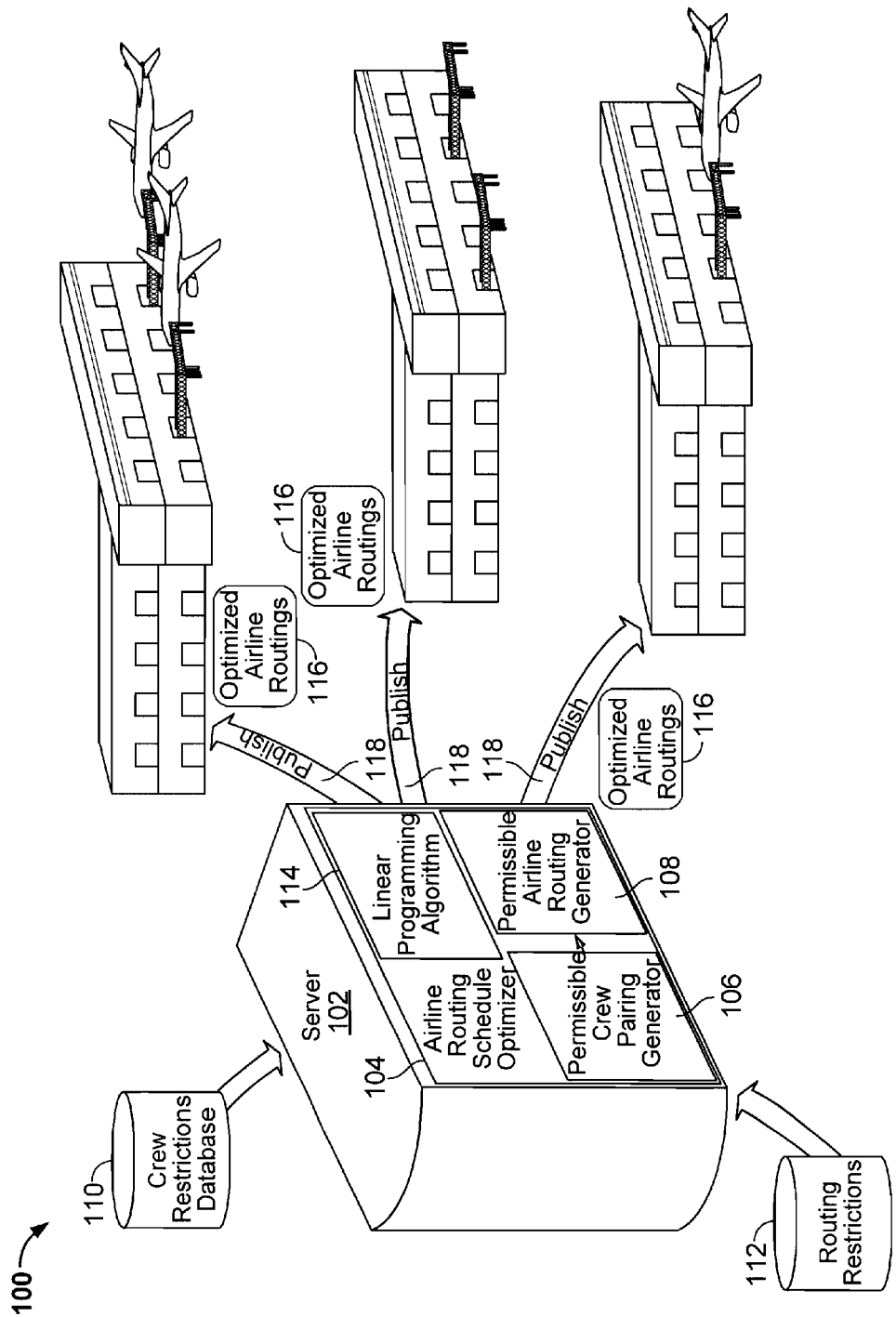
FIG. 1 shows an example system for calculating optimized aircraft routings in such a combined single optimization.

FIG. 1 shows an example system 100 for calculating optimized aircraft routings in such a combined single optimization. The system 100 can include a server 102 that runs an airline routing schedule optimizer 104. The schedule optimizer 104 can include a permissible crew pairing generator 106 and a permissible airline routing generator 108.

In one implementation, subsequently described in greater detail, the crew paring generator 106 can construct a time/space graph of flight legs, where the graph can represent all the possible crew connections at a station from an incoming flight to the next outgoing flight. The crew paring generator 106 can traverse the graph, checking whether each flight leg in the graph is "legal" or meets certain crew restrictions specified by, for example, information stored in a crew restriction database 110. The result of the graph traversal can include a set of crew pairings that are permitted, or legal. In some implementations a crew pairing may be restricted to include a tour that starts at a crew base, ends at a crew base, and covers multiple flights.

The permissible airline routing generator 108 can construct a time/space graph of the resulting crew pairings, where the graph can represent all the possible crew pairings at a base station from a given pairing. The airline routing generator 108 can traverse the graph, checking whether each new pairing and an associated routing is legal according to information stored in a routing restriction database 112.

Legal routings can then be used as input to a linear programming algorithm 114 also associated with the airline routing schedule optimizer 104. For example, the legal routings determined by the routing generator 108 can be used as input columns for an integer programming (IP) procedure, which determines optimized airline routings 116 based on specified optimization variables such as revenue generated, aircraft use, cost of flights, etc.

The server 102 can then publish, or transmit, the optimized airline routings to stations served by the airline as indicated by arrow 118.

For illustrative purposes, the ASR problem solved by the airline routing schedule optimizer 104 is defined here to include the following assumptions.

First, that there exists a set of proposed operational flight legs over a fixed time horizon. Each flight is assumed to have known departure and arrival times and flight revenues. In addition, each flight is flagged as mandatory (i.e., must be included in the final schedule) or optional (i.e., the flight's inclusion in the final schedule is optional).

Second, that there exists a set of additional flight and routing constraints, which may include minimum/maximum number of aircraft routings to produce, minimum/maximum number of landings per day, minimum/maximum number of block hours to be flown per day, minimum/maximum time (e.g., in hours) of a given routing, station restrictions (e.g., such as no overnights at a particular station or a required number of overnights at a station), and minimum/maximum turn times by station.

Third, that there exist crew pairing restrictions and costs for each aircraft routing. Fourth, that there exists additional restrictions that at least (or at most) k of a specified subset S of n flights must be covered with k≤n.

In one implementation, given these assumptions, the ASR problem can be defined as finding a flight schedule and set of aircraft routings that minimizes the total costs and satisfies the constraints specified above. The above problem may be considered a cost minimization problem. For example, for each routing, costs can be assigned based on operating time and block times as well as penalties for violating the flight and routing constraints stated above. Revenue for each flight can be incorporated by assigning an opportunity cost for not operating the given flight. This opportunity cost may be considered as equal to the revenue of the flight if the flight is optional, and can be set to an arbitrarily large penalty cost (e.g., 10 or 100 times the largest revenue) if the flight is mandatory.

By excluding the crew pairing restrictions and additional restrictions (i.e., that at least (or at most) k of a specified subset S of n flights must be covered with k≤n), the problem may reduce to a relaxed ASR problem. In some implementations, the relaxed ASR problem can be modeled as a standard Integer Programming (IP) problem as follows:

Let
R={of all possible legal (i.e. satisfying constraints (b)-(f)), aircraft routings}; where it is assumed that |R|=N, that is, that there are N total legal routings.
F={of all flight legs}; where it is assumed that |F|=M, that is, that there are L total flight legs.
$x_i$=the ith routing in the set R, 1≤i≤N
$f_j$=the jth flight leg, 1≤j≤M
$c_i$=the cost of routing $x_i$
$p_j$=the opportunity cost associated with not covering flight j.
$a_{ij}$=1 if routing $x_i$ contains flight $f_j$ and 0 otherwise
L=minimum number of routings to construct
U=maximum number of routings to construct
Using these definitions, the standard ASR problem can be formulated as:

$$\text{Min} \sum_i c_i x_i + \sum_j p_j S_j$$

subject to:

$$\sum_i a_{ij} x_i + S_j = 1 \quad 1 \le j \le N \quad (1)$$

$$L \le \sum_i x_i \le U \quad (2)$$

$$x_i \varepsilon \{0, 1\} \quad (3)$$

The variables $S_j$ represent so called "slack variables" for the constraints in (2) and have the property that $S_j > 0$ if and only if flight j is not covered.

The constraints (1) ensure that every flight is covered at most once, i.e., included in at most one routing. The constraints (2) limit the number of routings created to be between the user supplied upper and lower bounds, These constraints can either be "hard" constraints that must be satisfied or can be implemented as "soft" constraints by adding appropriate slack variables and adding a penalty term to the objective function. The constraints (3) are integrality constraints that force the solution to either include a particular routing or not.

However, using this formulation in practice may be difficult because of the size of the set R. In general, there can be millions of such routings and exhaustively generating the entire set likely cannot be done in a reasonable time. Consequently, in some implementations, column generation techniques are used to generate only a "good" restricted subset of the set R and solve the problem over that subset.

Column generation techniques may have many implementations. In one implementation, a column $x_i$ in the Integer Programming (IP) algorithm corresponds to a specific aircraft routing. The column generation technique for airline scheduling problems may include replacing the set R of all possible routings with a restricted set $R_r$ and then solving the above IP problem over $R_r$. The key to success of such a strategy can involve choosing routings for the set $R_r$ that are likely to be in the optimal solution of the original problem. One implementation that may be used for generating good solutions, is as follows: (1) choose a subset $F_s$ of the flights in F; (2) generate all legal, or permissible, routings using only flights in $F_s$; and (3) repeat steps 1-2 until a specified number of unique routings are generated.

Once the set $F_s$ is determined, a next step can include generating all legal routings based on these flights. Here, "legal" means that all regulatory and operational restrictions, for example, represented by the above described flight and routing constraints are satisfied. Other operating constraints may include limiting the number of legs in a routing, ensuring a minimum and maximum turn time between flights, restricting the number of hours of flight time, and limiting the total time of a routing.

In one implementation, legal routings can be generated using a depth first search of a time/space graph constructed from the flight legs. Using this graph, a routing is constructed, one leg at a time, by adding a new leg to the routing and checking the resultant routing for legality. If the routing is legal, it is stored for use in the set $R_r$. If the addition of the leg causes the routing to be illegal, the leg is discarded and the process backtracks to the last legal leg added. This can continue until either all paths in the graph have been explored, or until the required number of legal routings has been generated.

In one implementation, the depth first search (DFS) procedure is as follows:

Step 1: Create a time/space graph of the flight legs in $F_s$. This graph represents all the possible next flight connections at a station from an incoming flight to the next outgoing flight. Such connections must satisfy the Minimum/Maximum flight connection times for a routing.

Step 2: Let the current routing be $R_0$ and set $R_0=\{\ \}$ and i=0.

Step 3: If i=0, choose an originator leg $I_1$, to be the first leg in the routing and set $R_1=\{I_1\}$ and i=1 If all originator legs have been investigated, Stop.

Step 4: If $R_i$ satisfies all legality constraints, store the routing, $R_i$, for use in the IP.

Step 5: If $R_i$ is not legal, remove the last leg, $I_i$ and set i=i−1.

Step 6: If i=0, Go to Step 3.

Step 7: Choose the next unexplored leg, $I_{i+1}$ from the graph that is the earliest flight that satisfies the minimum connection time from the leg $I_i$. Go to Step 4.

In some implementations, the ASR problem and its solution can be modified to take into account the simultaneous solution of the aircraft routing and crew scheduling (pairing) problem using a modified column generation approach as previously discussed. Also, the ASR problem and its solution can integrate the addition of constraints into the model to allow flexibility for a user to select a subset of flights within a market from a given set of possible flight schedules. Both of these modifications will be discussed in more detail below.

Simultaneous Solution of Aircraft Routing and Crew Scheduling

The previously described approach for generating aircraft routings does not consider crew pairings. Historically, airlines have used a sequential approach to schedule generation. First a flight schedule is produced. Once the flights are known, aircraft routings for each fleet are determined. Finally, crew schedules, or pairings, are created based on the results of the first two steps. This sequential approach is dictated by the complexity of the underlying problems. While in theory, one inclusive optimization problem that would solve all three problems simultaneously could be formulated, the size and complexity of such a model is beyond the capability of current solver technology and hence precludes it use in practice.

However, certain operational efficiencies and cost savings can be realized by solving the aircraft routing and crew scheduling problems in one model. In particular, it can be beneficial to create one day aircraft routings—which facilitate the creation of crew pairings—for smaller airlines that operate a single (or very few) crew base and whose crew are assigned single day trips that start and end at the base and contain no layovers at out stations. In this example, the routings can consist of a series of single duty legal crew pairings, each of which start and end at a base station and satisfy certain operational crew restrictions including minimum/maximum flying time, minimum/maximum time away from base, maximum number of landings, and minimum/maximum sit (time between consecutive flights) time.

As an example, consider the following single day aircraft routing starting and ending at the base station BKI:

BKI-PEN-BKI-MYY-BKI-TWU-BKI-KUL-BKI

This routing consists of the 2 legal crew duties

BKI-PEN-BKI-MYY-BKI and

BKI-TWU-BKI-KUL-BKI.

By including crew scheduling constraints into the aircraft routing problem, the final flight schedule may be assured of being crew feasible, and the inclusion of such constraints can greatly simplify the creation of consistent crew pairings.

In one implementation, one day aircraft routings can be created, wherein the routings satisfy, for example, the following crew scheduling constraints: 1) each routing starts and ends at the sane crew base; and 2) each routing can be divided into exactly n one duty legal crew pairings that also start and end at the same crew base as in 1). The number n, depends on airline policy, but may be equal to, for example, two or three.

To accomplish the one day aircraft routings, the standard column generation procedure discussed above may be modified by replacing it with a two-step process. In the first step, legal one duty crew pairings can be constructed using a Depth First Search (DFS) procedure. Then, in the second step, these crew pairings can be linked together to form the final aircraft routings.

Specifically, in one implementations, the steps include creating one duty crew pairings by (a) creating a time/space graph of the flight legs. This graph can represents all of the possible next crew connections at a station from an incoming flight to the next outgoing flight, where such connections satisfy the minimum/maximum crew connection times; and (b) performing a DFS of this graph using the DFS procedure described above. Note that, rather than checking routing legalities after each leg, the appropriate crew legalities can be checked in the DFS procedure. Also, crew pairings can be restricted to start and end at a base.

Once the set of possible crew pairings are generated, they can be linked together, again using, for example, a DFS procedure to construct the final aircraft routings. Specifically, the routings can be created from the crew pairings by (a) creating a time/space graph of the crew pairings. This graph can represent all the possible next crew pairings at a base station from a given crew pairing. The minimum routing connection time can be used between two pairings. Next, in a step (b), a Depth First Search of this graph can be performed using the DFS procedure described above. Note that, after each addition of a new pairing, routing legalities used to confirm that the addition of the flight leg is permissible. In one example, a routing is not legal unless it contains n crew pairings.

This procedure can be used to construct desired routings that also satisfy specified crew pairing restrictions. These routings can then be used as input columns for the IP whose solution leads to an optimal set of aircraft routings.

Figure 2:
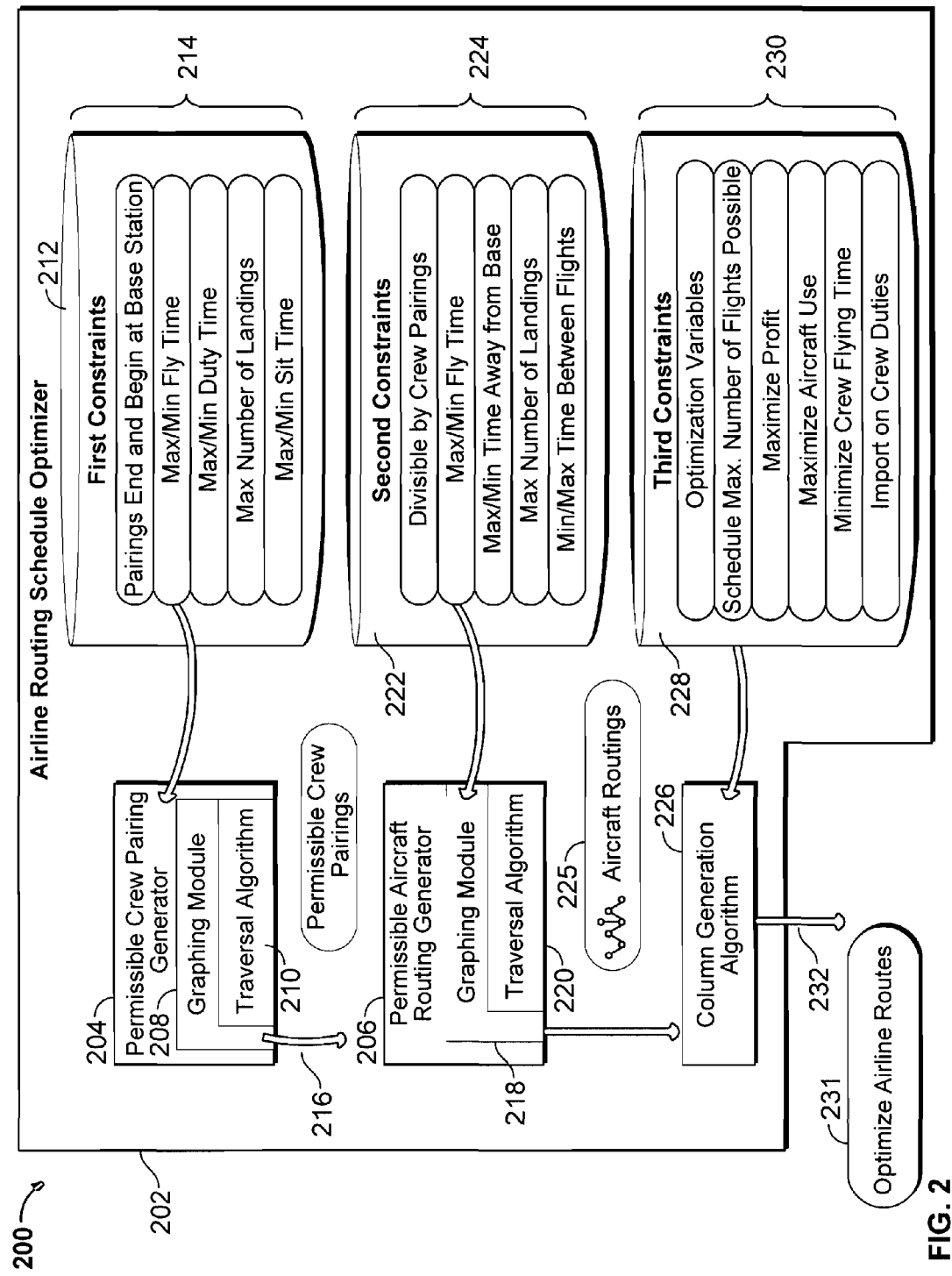
FIG. 2 is a diagram of an example system for generating optimized aircraft routings that take into account legal crew pairings.

FIG. 2 is a diagram of an example system 200 for generating optimized aircraft routings that take into account legal crew pairings. The system 200 includes an airline routing schedule optimizer 202. Similar to the schedule optimizer 104 of FIG. 1, the schedule optimizer 202 includes a permissible crew pairing generator 204 and a permissible aircraft routing generator 206.

The permissible crew pairing generator 204 includes a graphing module 208 that creates, for example, the time/space graph of the flight legs as described above. The graphing module 208 can include a traversal algorithm 210 that is used to perform a traversal of the graph generated by the graphing module 208. For example, the traversal algorithm 210 may include instructions to execute a DFS of the time/space graph of the flight legs as previously described.

In some implementations, as part of the graph generation, the crew paring generator 204 can build the graph so that each node in the graph is associated with an airline station and each edge between the nodes represents flight legs and/or a crew connection at a station from an incoming flight to the next outgoing flight. The crew paring generator 204 can enforce restrictions for the connections. For example, an edge representing a connection may be permitted only if such a connection satisfies a minimum/maximum crew connection time (e.g., the connection must allow the crew 45 minutes between incoming and outgoing flights, but the time between these flights must not exceed 4 hours). If a connection does not satisfy this constraint, the graphing module 208 does not add it to the graph in some implementations.

Additionally, as part of the traversal, the traversal algorithm 210 can check crew legalities after each edge is added to the graph. For example, the crew legalities can be stored as first constraints in a database 212 accessible to the traversal algorithm 210. As discussed previously, the first constraints can include, for example, requirements 214 that crew pairings start and end at a base station, that maximum/minimum fly times for crews (time that the crew is in the air) are met or not exceeded, that maximum/minimum duty times for crews (time that the crew is on duty) are met or not exceeded, that maximum/minimum number of landings are met or not exceeded, and that that maximum/minimum sit time (time between incoming and outgoing flights) are met or not exceeded.

The resulting set of permissible crew parings can be input into the permissible aircraft routing generator 206 to create a set of permissible aircraft routings as shown by an arrow 216.

In some implementations, the permissible aircraft routing generator 206 can then link the permissible crew pairings together to form a time/space graph. For example, the routing generator 206 can include a graphing module 218 that builds a graph where the nodes represent stations and the edges represent possible next crew pairings at a station (e.g., base station) given a previous crew pairing arriving at the station. In building the graph, the graphing module 218 can enforce constraints in the determination of whether edges should be added to the graph. For example, the graphing module 218 may only permit the addition of edges representing crew pairings if a minimum routing connection time is used between two pairings (e.g., if a time between the arrival time for a first aircraft having the crew and a departure time for a second aircraft to have the crew is at least 1 hour).

The graphing module 218 may also execute a traversal algorithm 220. Again, this traversal algorithm 220 may include a DFS. During the DFS, routing legalities may be checked after the addition of each new pairing, or edge, of the graph. For example, the routing legalities may be included in a database 222 of second constraints, where the constraints include requirements 224 that a routing must be divisible by n crew pairings (where the n is an integer specified by the airline), that a routing satisfy a minimum/maximum fly time (time in the air for the aircraft assigned the routing), that a routing satisfy a minimum/maximum time away from a base station, that a routing satisfy a minimum/maximum number of landings, or that a routing satisfy a minimum/maximum time between flights.

The permissible aircraft routing generator 206 can input the resulting permissible aircraft routings 225 into a column generation algorithm 226, which can determine an optimized set of aircraft routings from the permissible aircraft routings 225. The optimization of the aircraft routings may be based on a third set of constraints stored in a database 228. The constraints may include optimization variables 230 for which the column generation algorithm should optimize the solution. For example, the optimization variables 230 can include optimizing the final flight schedule so that the maximum number of flights possible are flown, optimizing to maximize profit, optimizing to maximize aircraft use, optimizing to minimize crew flying time, optimizing based on import on crew duty times, or a combination thereof where some optimization variables may receive more weight than other variables.

After execution of the column generation algorithm, the optimized airline routing schedule 231 can be output as indicated by an arrow 232.

Figure 3:
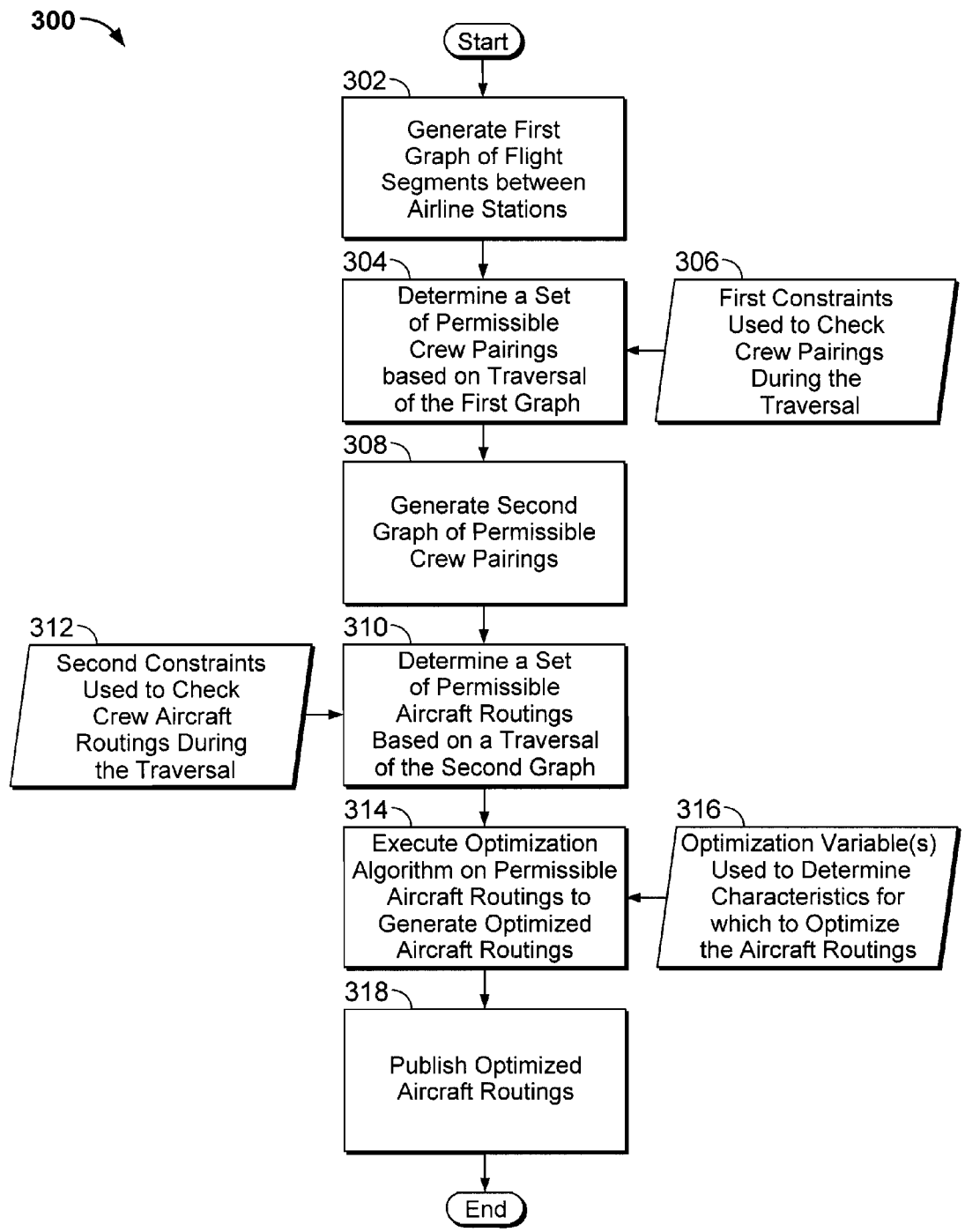
FIG. 3 shows a simplified flow chart of an example process for constructing desired routings that also satisfy specified crew pairing restrictions.

FIG. 3 shows a simplified flow chart of an example process 300 for constructing desired routings that also satisfy specified crew pairing restrictions. The process 300 may be performed, for example, by a system such as the system 100 or system 200 and, for clarity of presentation, the description that follows uses the systems 100 and 200 as the basis of an example for describing the processes. However, another system, or combination of systems, may be used to perform the process 200.

In step 302, a first graph of flight segments between airline stations is generated. For example, the permissible crew paring generator 204 can create a first graph of flight legs. The initial graph may include flight legs that satisfy certain crew connection times so that a crew has enough time (but not too much time) between flight legs.

In step 304, a set of permissible crew pairings can be generated based on a traversal of the first graph. For example, the traversal algorithm 210 associated with the permissible crew paring generator 204, can use a DFS strategy where each crew pairing is checked against first constraints 306 to determine if the crew pairing is legal after the pairing is added to the graph. If the crew pairing is permissible, it remains in the graph. However, it does not satisfy one or more of the first constraints, the crew pairing is removed from the graph.

In step 308, a second graph that includes permissible crew pairings can be generated. For example, the permissible aircraft routing generator 206 can create a second graph of crew pairings. The second graph may include next crew pairings at a base station when given a crew pairing that arrives at the base station. In order to be added to the graph, the routing generator 206 may check to see if the next and given crew pairings meet a minimum connection time between the two pairings. If so, the crew pairing from the first graph can be added to the second graph. If not, the crew pairing may be omitted from the second graph.

In step 310, a set of permissible aircraft routings is generated based on a traversal of the second graph. For example, the traversal algorithm 220 associated with the permissible aircraft routing generator 306 can traverse the second graph. The traversal may be in the form of a DFS, where routing legalities are checked after the addition of each new crew pairing. The routing legalities may be accessed from second constraints 312. For example, the traversal algorithm 220 may determine that a particular routing is not legal, or permitted, if the routing does not contain a specified number of crew pairings. In this case, the routing removed from the second graph. Otherwise, all legal routings may remain in the second graph.

In step 314, an optimization algorithm can be executed on permissible aircraft routings to generate optimized aircraft routings. For example, the legal routings determined in step 310 can be input into the column generation algorithm 226, which uses optimization variables 316 to determine an optimum set of aircraft routings.

In step 318, the optimized set of aircraft routings can be published so that appropriate users associated with the airline can operating according to the resulting flight schedule for the airline.

Figures 4A, 4B:
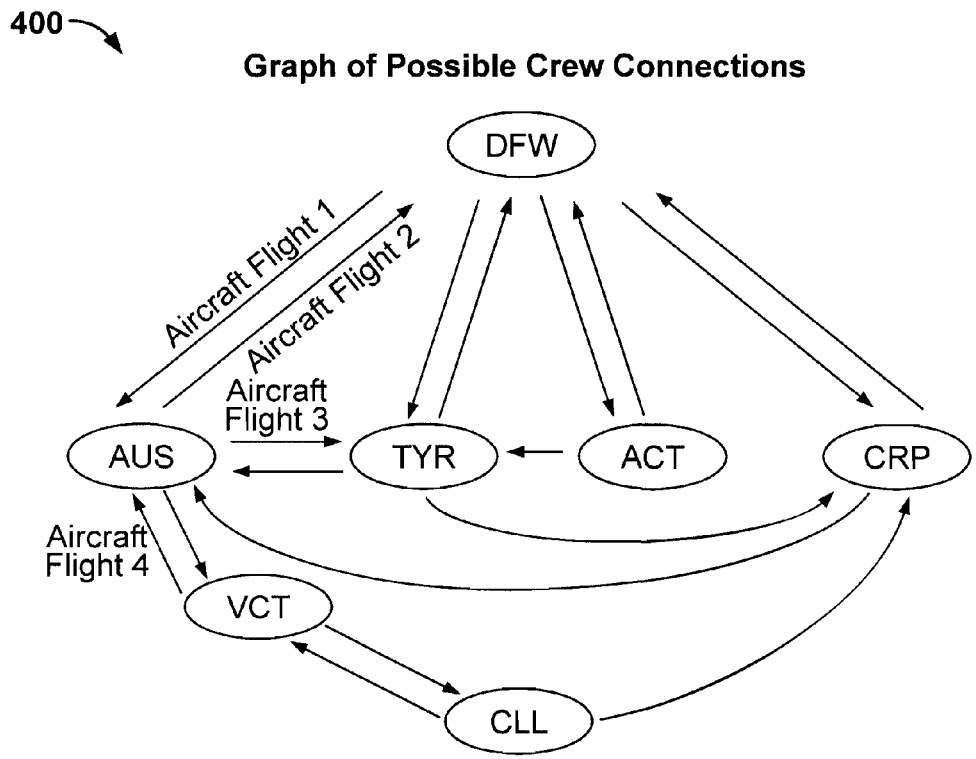
FIG. 4A is a diagram of an example first graph of possible crew pairings and FIG. 4B is an example table that illustrates that each of the aircraft flights labeled in first graph are permissible.

FIG. 4A is a diagram of an example first graph 400 of possible crew pairings. The first graph 400 includes nodes DFW, AUS, TYR, ACT, CRP, VCT, and CLL representing airline stations from which an airline makes flights. Edges between the graph nodes include flight legs between DFW and AUS labeled Aircraft Flight 1 and Aircraft Flight 2, respectively, flight leg from AUS to TYR labeled Aircraft Flight 3, and flight leg from AUS to VCT labeled Aircraft Flight 4.

In one implementation, the graph includes all possible crew connections possible between stations, where a connection is deemed possible if it satisfies a minimum/maximum crew connection time. The example table of FIG. 4B illustrates that each of the aircraft flights labeled in first graph 400 are permissible. For example, Flight 1 arrives at AUS at 9:30 CST. If it is assumed that the minimum crew connection time is 20 minutes and the maximum connection time is 2 hours, then Flights 2-4 are permissible because they leave at times after the arrival of Flight 1 (e.g., 10:15 AM, 10:10 AM, and 11:00 AM, respectively), where the connection times meet the specified min/max connection times.

FIGS. 5A and 5B are diagrams of portions of a first graph illustrating permissible and impermissible crew pairings. FIG. 5A shows a first portion 500 with permissible crew pairings between DFW, AUS, and TYR. In this example, the crew paring may be permissible because, among other things, the fly time for the crew (i.e., the amount of time the crew is in the air) satisfies both a minimum and maximum fly time specified by first constraints such as the first constraints 212 of FIG. 2. Consequently, during traversal by a traversal algorithm (e.g., a DFS), the edges, or crew pairings between the stations will be left intact.

However, if during a traversal of the first graph, the traversal algorithm determines that a crew pairing is impermissible, the crew paring can be removed from the graph. For example, a second portion 550 of the first graph can include a crew pairing between DFW, AUS, VCT, and CLL. During the traversal, the traversal algorithm may check to see if the addition of the CLL to the crew pairing violates any of the first crew paring restraints. In this example, it does because if the station CLL is added to the crew paring, the maximum fly time would be exceeded. Consequently, the station CLL can be removed from the crew pairing. In some implementation, not shown, the station VCT may be joined through other edges that are then traversed to determine if any crew pairing restrictions are violated. If not, the stations/flight segments can remain part of the crew pairing.

FIG. 6 shows an example second graph 600 of a possible aircraft routing for a single aircraft. The aircraft travels in the following sequence of stations: DFW-AUS-DFW-TYR-DFW-ACT-DFW-CRP-DFW. The aircraft routing generator may determine that this sequence is a permissible routing because it satisfies airline routing constraints. For example, the airline may specify that the routing be divisible by two crew parings. Here, the sequence is divisible by two legal crew parings (i.e., DFW-AUS-DFW-TYR-DFW and DFW-ACT-DFW-CRP-DFW), and thus, satisfies this constraint.

Referring to the implementation(s) given above for generating aircraft routings that satisfy crew scheduling constraints, note that different legalities can be used at each stage. For example, when constructing the crew pairings, crew legalities are checked (e.g., pairings must start and end at a crew base, minimum and maximum flying time, minimum and maximum duty time, maximum number of landings, and minimum and maximum sit (i.e., time between consecutive flights) time).

However, when linking the crew pairings together to from a routing, the routing legalities discussed earlier may be enforced (e.g., a routing is not considered legal unless it contains the specified number, n, of crew pairings). In some implementations, the legalities, or restrictions, can be relaxed restrictions so that a range of values may be used to determine whether a pairing or routing is legal. For example, the routing legality that a routing is not legal unless it contains n crew pairings could be relaxed so that legal routings could contain at least one and at most n pairings.

Market Flight Scheduling Constraints

As previously mentioned, the addition of new constraints to the standard IP model may allow flexibility in choosing a final flight schedule. In some implementations, IP models allow flights to be designated as either Mandatory or Optional. Mandatory flights must be included in the final aircraft routings, while Optional flights may be omitted based on revenue and available aircraft. In many cases, an airline may prefer to solve a more detailed problem than these implementations allow.

For example, consider a case where an airline would like to serve a particular market, JFK-MIA, at lease three times a day, but the exact flight times are flexible and the flight revenue depends on the time of day that the flight operates. One way to approach this problem could be to add a set of six proposed flights with departure times throughout the day and with estimated revenue based on flight times into the schedule, and to designate the six proposed flights as optional. However, without further constraints, based on costs/revenue tradeoff, the optimization model is free to include or exclude any of these flights (from zero to six) and there is no guarantee that at least three will be chosen.

In order to address this situation, additional constraints can be added to the standard IP model. These constraints can specify that the final aircraft routings include a specified number (say k) of flights from a superset of n designated flights. To define these constraints, an assumption can be made that a user has specified s such subsets of flights. Also, to define these constraints, let $B_m$={mth subset of optional flights in F} $1 \le m \le s$
$N_m=|B_m|$ be the number of flights in set $B_m$.
$l_m$=Minimum number of flights in set $B_m$ that must be chosen
$u_m$=Maximum number of flights in set $B_m$ that can be chosen
$S_j$=slack variable for flight j (as defined in the IP above)

Then the following s constraints are added to the standard linear programming (LP) model:

$$l_m \le N_m - \sum_{j \in B_m} S_j \le u_m \quad 1 \le m \le s$$

Here, $S_j=0$ if flight j is covered and 1 if flight j is not covered. Hence for each subset $B_m$ of designated flights, these constraints may ensure that at least $l_m$ and at most $u_m$ flights will be covered in the optimal solution. As with other similar constraints, these constraints can be either be implemented as hard constraints as specified above, or as soft constraints by adding appropriate slack variables and penalty terms into the IP objective function.

Figure 7:
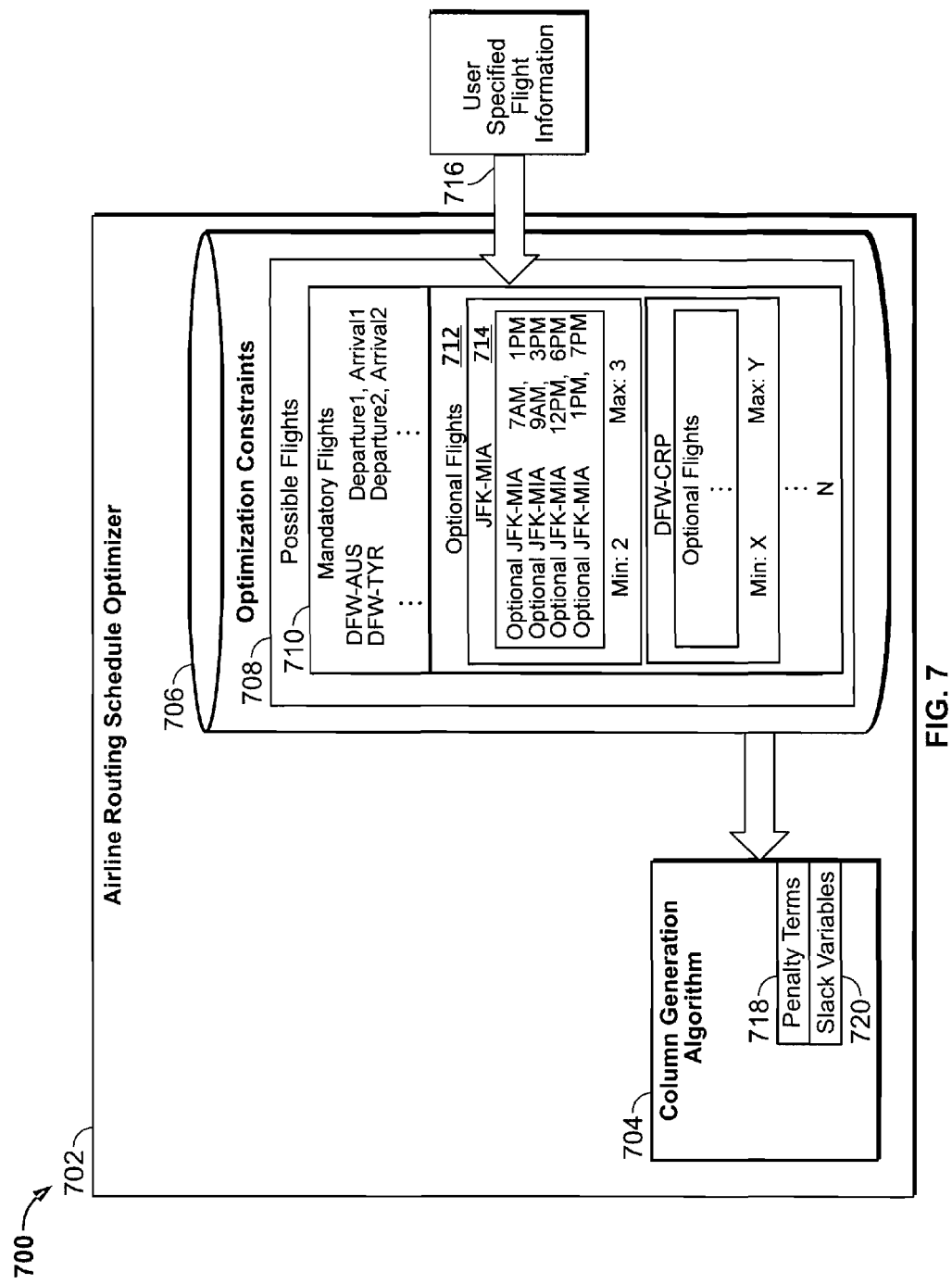
FIG. 7 is a diagram of a system for using market Flight scheduling restraints in generating a flight schedule.

FIG. 7 is a diagram of a system 700 for using market flight scheduling restraints in generating a flight schedule. The system can include an airline routing schedule optimizer 702 that includes a column generation algorithm 704 and optimization constraints 706. The optimization constraints can include information associated with all possible flights 708 associated with an airline. In some implementations, the possible flights 708 can be divided into at least two groups: mandatory flights 710 and optional flights 712 as previously discussed.

In this example, the optional flights include four flights for a particular market 714, namely, flights between JFK and MIA. The user can specify a minimum number of optional flights to include in the final optimized schedule (e.g., min=2) and a maximum number of optional flights to include in the final optimized schedule (e.g., max=3). This user input is illustrated by an arrow 716.

The optional flights 712 can include several different markets 2-N. The user can specify min/max flights for each market or single master min/max numbers that apply to all markets.

In some implementations, the column generation algorithm can use the min/max optional flight information as a hard constraint in the form of the equation given above that must be satisfied during the optimization. In other implementations, the min/max optional flight information can be used in soft constraints. For example, instead of requiring that the above equation be satisfied, the column generation algorithm may simply assign penalties to flights or flight solutions that do not meet the given constraints. Consequently, flight scheduling solutions that include more or less optional flights than specified are disfavored by associating an increased cost, or penalty, with such outcomes during the optimization process by the column generation algorithm 704.

Additionally, as discussed previously, the appropriate slack variables $S_j$ can be added to the column generation function to implement the constraints in a relaxed manner.

Figure 8:
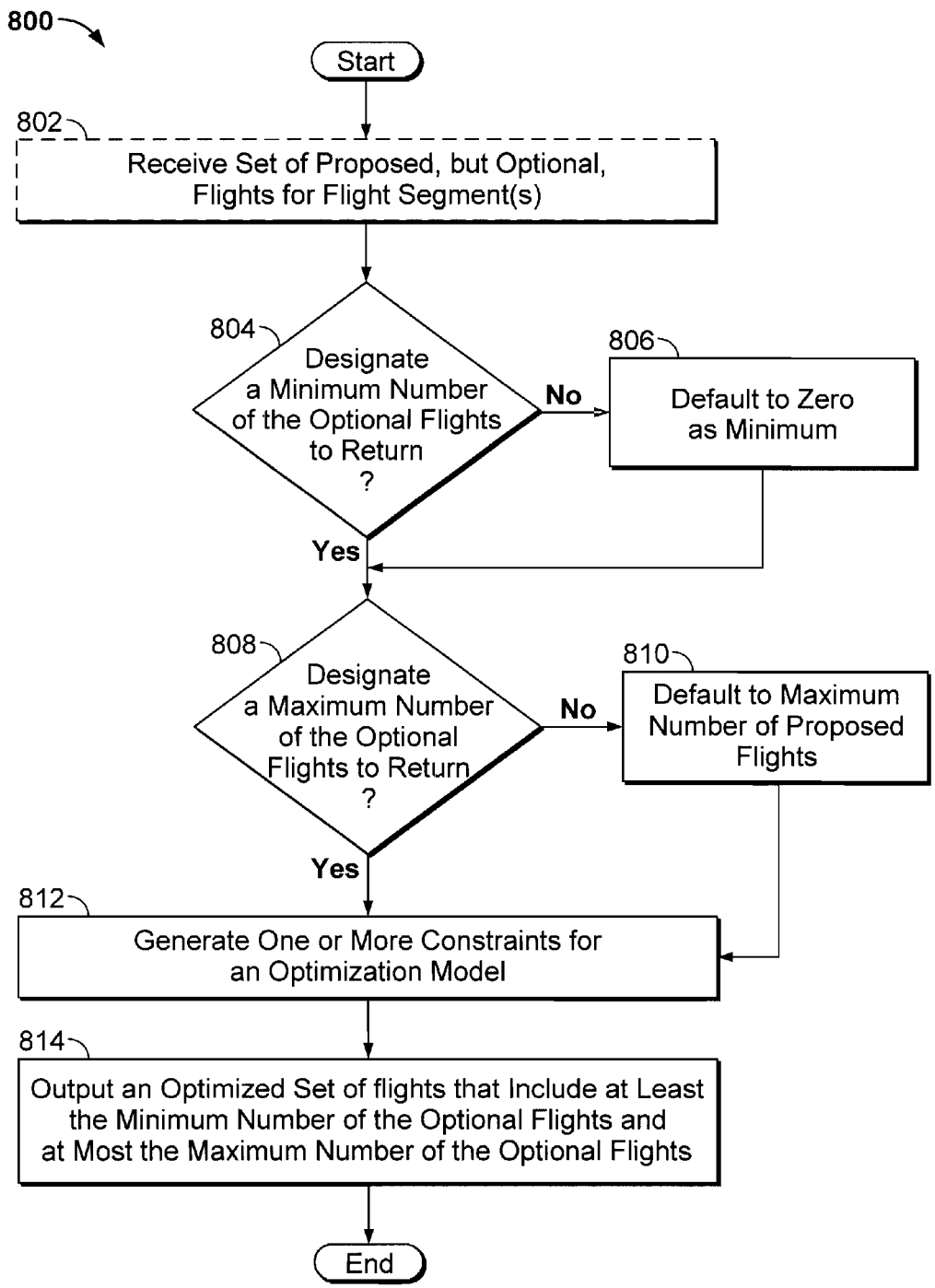
FIG. 8 is a flow chart of an example process for using market flight scheduling restraints in generating a flight schedule.

FIG. 8 is a flow chart of an example process 800 for using market flight scheduling restraints in generating a flight schedule. The system 700 may perform operations illustrated in the process 800; however, other systems such as systems 100, 200, or combinations of systems may also execute the operations described in association with process 800.

In optional step 802, a set of proposed, but optional, flights for a particular market are received. For example, a user may specify several proposed flights for a market by inputting information such as arrival and departure times. In other implementation, this information already is accessible by the optimization model and need not be entered. In some implementations, a use can enter this information via a graphical user interface that overlays the airline routing schedule optimizer 702.

In step 804, a determination is made whether a minimum number of optional flights is received. If a minimum number of optional flights is received, the process can proceed to step 808. For example, a user can select a particular market and designate a number of optional flights that the user wished to be included in the optimized flight schedule. Once this information is received at the airline routing schedule optimizer 702, the optimizer 702 can execute step 808.

If a minimum number is not received (e.g., after a determined period of time or based on an indication from the user), the process can proceed to step 806.

In step 806, the minimum number may be assigned a default value such as zero. Assignment of zero as a minimum value effectively removes this constraint from consideration during optimization. In other implementations, another default value, such as one, etc. can be assigned. After assignment of a default value, the process can proceed to step 808.

In step 808, a determination is made whether a designation of a maximum number of options flights has been received. This step may be similar to the step 804 described above. If a maximum number of optional flights is not received, the process 800 can proceed to step 810, where a default value is assigned as the maximum number of flights to return in the flight schedule. In this example, the default value is set to the maximum number of proposed flights, which effectively removes the constraint from the optimization process. After a maximum number of optional flights is set either by default or by a user, the process 800 can proceed to step 812.

In step 812, one or more constraints can be generated for the optimization model. For example, the column generation algorithm can insert the received minimum and/or maximum optional flights in an equation such as that previously described above.

In step 814, an optimized set of flights that include at least the minimum number of the optional flights and at most the maximum number of optional flights can be output. For example, the column generation algorithm 704 can generate an optimized solution for the scheduling problem while adhering to fixed constraints set by a constrain equation. These results can then, for example, be integrated into a flight schedule and published.

In other implementations, the minimum/maximum number of optional flights is implemented using penalty terms and the appropriate slack values. The column generation algorithm can then generate a flight schedule that favors, but does not require, the inclusion of the max/min number of optional flights.

Figure 9:
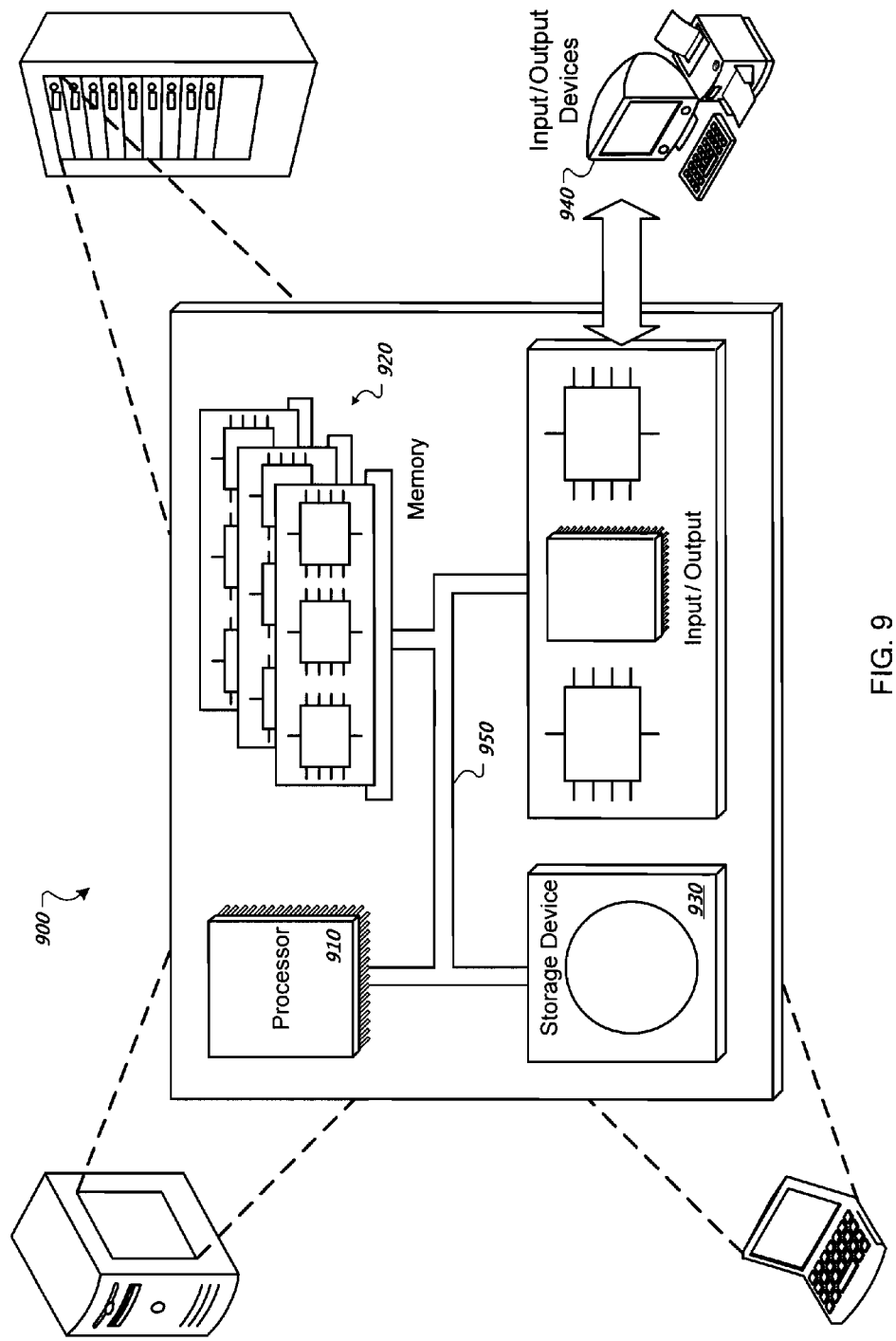
FIG. 9 is a schematic diagram of a computer system.

FIG. 9 is a schematic diagram of a computer system 900. The system 900 can be used for the operations described in association with any of the computer-implement methods described previously, according to one implementation. The system 900 is intended to include various forms of digital computers, such as laptops, desktops, workstations, personal digital assistants, servers, blade servers, mainframes, and other appropriate computers. The system 900 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for generating aircraft routings comprising:

generating, using one or more processors, a first graph comprising possible flight segments between airline stations for an airline, the possible flight segments comprising all possible crew connections at a first airline station from an incoming flight to an outgoing flight and being based on crew scheduling constraints associated with the first airline station;

determining, using the one or more processors, a first set of permissible crew pairings based on a first traversal of the first graph, the first traversal being based on at least a minimum crew connection time, wherein a permissible crew pairing comprises a sequence of one or more flight segments that a crew is permitted to travel subject to specified first constraints;

determining, using the one or more processors, a second set of permissible crew pairings based in part on the first set of permissible crew pairings and the crew scheduling constraints associated with a second airline station, at which at least one permissible crew pairing of the first set of permissible crew pairings is to arrive;

generating, using the one or more processors, a second graph comprising the second set of permissible crew pairings;

determining, using the one or more processors, a set of permissible aircraft routings based on a second traversal of the second graph, the second traversal being based on at least one of the permissible crew pairings, such that permissible aircraft routings in the set of permissible aircraft routings each account for the second set of permissible crew pairings, wherein a permissible aircraft routing comprises a series of one or more flight segments for an aircraft to fly subject to specified second constraints;

generating a set of optimized aircraft routings using an integer programming algorithm that is executed using the one or more processors and that accepts the determined set of permissible aircraft routings as input, such that each optimized aircraft routing is already associated with permissible crew pairings; and outputting the set of optimized aircraft routings for use in a flight schedule.

2. The method of claim 1, wherein nodes of the first graph comprise representations of the airline stations and edges of the first graph comprise representations of the flight segments between the airline stations.

3. The method of claim 1, wherein nodes of the second graph comprise representations of the airline stations and edges of the second graph comprise representations of crew that are permitted to travel on flight segments between the airline stations subject to the first constraints.

4. The method of claim 1, wherein the determined set of permissible crew pairings are linked in the second graph based on whether an arrival time for crew pairings associated with incoming flights at an airline station are within a specified minimum time of a departure time for crew pairings associated with outgoing flights.

5. The method of claim 1, wherein the set of optimized aircraft routings is optimized based on one or more optimization variables included in the linear programming algorithm.

6. The method of claim 5, wherein the optimization variables for which the set of optimized aircraft routings are optimized comprise cost of operations associated with aircraft routings, profit associated with the aircraft routings, or aircraft or crew use.

7. The method of claim 1, wherein the specified first constraints for the permissible crew pairings comprise regulatory, contractual, or operational constraints.

8. The method of claim 7, wherein the regulatory, contractual, or operational constraints comprise requiring that crew pairings start and end at the same airline station, maximum or minimum flying time for the crew, maximum or minimum on duty time for the crew, maximum number of landings for the crew, or maximum or minimum time between consecutive flights for the crew.

9. The method of claim 1, wherein the specified second constraints for the permissible aircraft routings comprising regulatory or operational constraints.

10. The method of claim 9, wherein the regulator or operational constraints comprise that a routing be divisible by integer n crew pairings, start and end at the same airline station, maximum or minimum flying time for the aircraft, maximum or minimum time away from a base airline station, maximum number of landings for the aircraft, or maximum or minimum time between consecutive flights for the aircraft.

11. The method of claim 1, wherein determining a set of permissible aircraft routings comprises requiring that an aircraft routing is divisible into integer n crew pairings, wherein each crew pairing starts and ends at the same airline station.

12. The method of claim 1, wherein the traversals of the first and second graphs comprise depth first searches.

13. The method of claim 1, wherein determining the set of permissible crew pairings based on the traversal comprises:
checking the first constraints for the crew after each flight segment;
determining that the first constraints are not violated; and
adding the segment to a permissible crew pairing.

14. The method of claim 1, wherein determining the set of permissible crew pairings based on the traversal comprises requiring that a permissible crew pairing start and end at the same airline station.

15. The method of claim 14, wherein the same airline station comprises a base station that is an airline hub for an airline associated with the crew.

16. The method of claim 14, wherein determining the set of permissible crew pairings based on the traversal further comprises requiring that the start and end at the same airline station occur during a 24-hour period.

17. The method of claim 1, wherein determining the set of permissible aircraft routings based on the traversal comprises:
checking the second constraints for the aircraft after each flight segment;
determining that the second constraints are not violated; and
adding the segment to a permissible aircraft routing.

18. The method of claim 1, wherein the integer programming algorithm comprises a column generation function.

19. The method of claim 1, wherein the first and second graphs comprise space/time graphs.

20. A computer program product tangibly embodied in a non-transitory computer-readable storage device, the computer program product including instructions that, when executed, perform operations for scheduling aircraft routings, the operations comprising:
generating a first data structure storing possible flight segments between airline stations for an airline, the possible flight segments comprising all possible crew connections at a first airline station from an incoming flight to an outgoing flight and being based on crew scheduling constraints associated with the first airline station;
determining a first set of permissible crew pairings based on a processing of the first data structure, the processing of the first data structure being based on at least a minimum crew connection time, wherein a permissible crew pairing comprises a sequence of one or more flight segments that a crew is permitted to travel subject to specified first constraints;
determining a second set of permissible crew pairings based in part on the first set of permissible crew pairings and the crew scheduling constraints in view of a second airline station, at which at least one permissible crew pairing of the first set of permissible crew pairings is to arrive;
generating a second data structure storing the second set of permissible crew pairings;
determining a set of permissible aircraft routings based on a processing of the second data structure, the processing of the second data structure being based on at least one of the permissible crew pairings, such that permissible aircraft routines in the set of permissible aircraft routings each account for the second set of permissible crew pairings, wherein a permissible aircraft routing comprises a series of one or more flight segments for an aircraft to fly subject to specified second constraints;
generating a set of optimized aircraft routings using an integer programming algorithm that accepts the determined set of permissible aircraft routings as input, such that each optimized aircraft routing is already associated with permissible crew pairings; and
outputting the set of optimized aircraft routings for use in a flight schedule.

21. A system for generating airline routings comprising:
one or more computers having
a crew pairing generation module to:
determine a first set of permissible crew pairings based on a first traversal of a first graph comprising possible flight segments between airline stations for an airline, the possible flight segments comprising all possible crew connections at a first airline station from an incoming flight to an outgoing flight and being based on crew scheduling constraints associated with the first airline station, the first traversal being based on at least a minimum crew connection time, wherein a permissible crew pairing comprises a sequence of one or more flight segments that a crew is permitted to travel subject to specified first constraints, and
determining a second set of permissible crew pairings based in part on the first set of permissible crew pairings and the crew scheduling constraints in view of a second airline station, at which at least one permissible crew pairing of the first set of permissible crew pairings is to arrive;

an aircraft routing module to:
  generate a second graph including the determined second set of permissible crew pairings, and
  determine a set of permissible aircraft routings based on a second traversal of a second graph comprising the determined set of permissible crew pairings, the second traversal being based on at least one of the permissible crew pairings, such that permissible aircraft routings in the set of permissible aircraft routings each account for the second set of permissible crew pairings, wherein a permissible aircraft routing comprises a series of one or more flight segments for an aircraft to fly subject to specified second constraints; and a column generation module to receive the determined set of permissible aircraft routings as input and output a set of optimized aircraft routings based on specified optimization constraints, such that each optimized aircraft routing is already associated with permissible crew pairings.

\* \* \* \* \*

UNITED STATES PATENT AND TRADEMARK OFFICE
CERTIFICATE OF CORRECTION

| | | |
|---|---|---|
| PATENT NO. | : 8,645,177 B2 | Page 1 of 1 |
| APPLICATION NO. | : 12/243490 | |
| DATED | : February 4, 2014 | |
| INVENTOR(S) | : Pachon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this
Second Day of June, 2015

Michelle K. Lee
*Director of the United States Patent and Trademark Office*